United States Patent
Zhao et al.

(10) Patent No.: US 11,846,801 B2
(45) Date of Patent: Dec. 19, 2023

(54) BACKLIGHT MODULE AND DISPLAY DEVICE

(71) Applicants: MIANYANG HKC OPTOELECTRONICS TECHNOLOGY CO., LTD, Mianyang (CN); HKC CORPORATION LIMITED, Shenzhen (CN)

(72) Inventors: Zhilong Zhao, Mianyang (CN); Haijiang Yuan, Mianyang (CN)

(73) Assignees: MIANYANG HKC OPTOELECTRONICS TECHNOLOGY CO., LTD, Mianyang (CN); HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/077,238

(22) Filed: Dec. 8, 2022

(65) Prior Publication Data

US 2023/0194771 A1    Jun. 22, 2023

(30) Foreign Application Priority Data

Dec. 22, 2021   (CN) .......................... 202111580647.2

(51) Int. Cl.
*F21V 8/00*    (2006.01)

(52) U.S. Cl.
CPC ......... *G02B 6/0088* (2013.01); *G02B 6/0031* (2013.01); *G02B 6/0078* (2013.01); *G02B 6/0055* (2013.01)

(58) Field of Classification Search
CPC .... G02B 6/0078; G02B 6/008; G02B 6/0088; G02B 6/0031; G02B 6/0068
See application file for complete search history.

(56) References Cited

U.S. PATENT DOCUMENTS

| | | | | |
|---|---|---|---|---|
| 8,047,669 B2* | 11/2011 | Bourdelais | ........... | G02B 6/0091 362/249.02 |
| 8,469,577 B2* | 6/2013 | Kang | .................. | G02B 6/0068 362/616 |
| 8,511,882 B2* | 8/2013 | Wu | ........................ | G02B 6/008 362/616 |
| 8,556,492 B2* | 10/2013 | Joung | .................... | G02B 6/008 362/616 |
| 9,885,826 B2* | 2/2018 | Feil | ...................... | G02B 6/0011 |
| 2012/0026423 A1* | 2/2012 | He | ........................ | G02B 6/0068 362/613 |

FOREIGN PATENT DOCUMENTS

CN     111915982 A    11/2020

* cited by examiner

*Primary Examiner* — Matthew J. Peerce

(57) ABSTRACT

A backlight module and a display device are disclosed. The backlight module includes a back plate and a plurality of light plate assemblies arranged on the back plate, and there is a seam between every two adjacent light plate assemblies. The backlight module further includes at least one light guide plate and at least one side light source. The light guide plate is arranged at the seam. The side light source corresponds to the light guide plate, is located on the side of the light guide plate, and provides a light source for the light guide plate.

16 Claims, 3 Drawing Sheets

BACKLIGHT MODULE AND DISPLAY DEVICE

CROSS-REFERENCE TO RELATED APPLICATIONS

This application claims the priority and benefit of Chinese patent application 2021115806472, titled "Backlight Module and Display Device" and filed Dec. 22, 2021, with China National Intellectual Property Administration, the entire contents of which are incorporated herein by reference.

TECHNICAL FIELD

The present application relates to the field of display technology, and in particular, to a backlight module and a display device.

BACKGROUND

The description provided in this section is intended for the mere purpose of providing background information related to the present application but doesn't necessarily constitute prior art.

The display market has been developing around several hotspots, including high color gamut, high contrast, high efficiency, thin and light, low cost, and healthy eye protection. Taking the TV market as an example, LCD (Liquid Crystal Display) achieves the above performances through LED (Light Emitting Diode) backlight, especially after the emergence of Mini LED backlight, it has become a popular choice for LCD to compete with OLED for the next generation of backlight. Compared with LED and OLED, Mini LED backlight has obvious cost advantages in the medium and large size market, which is in line with the trend of large screen in the medium and high-end market. Combined with local dimming control technology, Mini LED has better contrast and display effect, meeting the needs of high-end users.

At present, Mini LED backlights mostly use the light plate splicing process, and there is much light loss at the gaps of the light plates, which are prone to dark line problems.

SUMMARY

It is therefore a purpose of the present application to provide a backlight module and a display device, which can improve the uniformity of light output of the backlight module while solving the problem of dark lines at the gaps.

The present application discloses a backlight module. The backlight module includes a back plate and a plurality of light plate assemblies. The plurality of light plate assemblies are arranged on the back plate, and there is a seam between the adjacent light plate assemblies. The backlight module further includes at least one light guide plate and at least one side light source. The light guide plate is arranged at the seam. The side light source corresponds to the light guide plate, is located on the side of the light guide plate, and provides a light source for the light guide plate.

Optionally, the back plate is provided with at least one groove, and the light guide plate and the side light source are correspondingly arranged in the groove and fixedly connected to the back plate. The width of the light guide plate is greater than the width of the seam, and the thickness of the light guide plate is greater than the thickness of the light plate assembly.

Optionally, the light guide plate includes a main body portion and a limiting part, and the main body portion is arranged in the groove and is located below the light plate assemblies. The limiting portion is disposed on the side of the main body portion away from the back plate, is located between the adjacent light plate assemblies, and limits the light plate assemblies.

Optionally, the cross section of the limiting portion is quadrate, the limiting portion abuts with the light plate assemblies, and the top of the limiting portion is flush with the tops of the light plate assemblies.

Optionally, the limiting portion includes a first connecting portion and a second connecting portion. One end of the first connecting portion is connected with the main body portion, and the other end is connected with the second connecting portion. The width of the first connecting portion is smaller than the width of the second connecting portion and the width of the main body portion. The light plate assembly includes a light plate and a plurality of light-emitting units, and the plurality of light-emitting units are arranged on the side of the light plate away from the back plate. The height of the first connecting portion is greater than the thickness of the light plate. The end portion of the light plate is disposed between the main body portion and the second connecting portion.

Along the width direction of the seam, the cross-sections of the first connecting portion and the second connecting portion are both quadrate, and the cross-section of the limiting portion is T-shaped.

Optionally, the top of the limiting portion is higher than the top of the light plate assemblies.

Optionally, the limiting portion is fixedly connected to the light plate in the light plate assembly through an optical glue.

Optionally, the backlight module further includes a reflective sheet and a reflective layer. The reflective sheet is arranged on a side of the main body portion away from the light plate assembly, and the reflective layer is arranged on a side of the main body portion opposite to or facing the light plate assembly.

The present application discloses a display device, including the above-mentioned backlight module, and a display panel corresponding to the backlight module, wherein the backlight module provides a backlight source for the display panel.

Compared with the solution that solves the problem of dark lines in the seam during display by arranging the reflective sheet at the seam of the light plate assemblies, the present application provides the light guide plate and the side light source at the seam of the light plate assemblies. The light emitted by the side light source is incident from the side of the light guide plate, and by virtue of the light guide function of the light guide plate, it is emitted from the top of the light guide plate, so that the seam emits light, thereby solving the problem of dark lines in the seam. Furthermore, in a reflective sheet solution, the reflective sheet only reflects the light emitted by the light emitting units on the light plate, and the light emitting units are all on the sides of the reflective sheet, so the light emitted by the light emitting units is obliquely transmitted towards the reflective sheet, the light reflected back through the reflective sheet is also oblique, causing the light emitted from the seam to be very cluttered. In the present application, however, the light emitted by the light guide plate can be emitted vertically from the seam, so that the light emitted from the seam is uniformly arranged, thereby improving the light output effect of the backlight module.

BRIEF DESCRIPTION OF DRAWINGS

The accompanying drawings, which are included to provide a further understanding of the embodiments of the present application, constitute a part of the specification, are used to illustrate the embodiments of the present application, and together with the written description, serve to explain the principles of the present application. Obviously, the drawings used in the following description merely depict some embodiments of the present application, and for those having ordinary skill in the art, other drawings can also be obtained from these drawings without investing creative effort. In the drawings.

DETAILED DESCRIPTION OF EMBODIMENTS

It should be understood that the terminology used herein, the specific structural and functional details disclosed are intended for the mere purpose of describing specific embodiments and are representative, but the present application may be embodied in many alternative forms and should not be construed as limited only the embodiments set forth herein.

The present application will be described in detail below with reference to the accompanying drawings and optional embodiments.

Embodiment 1

Figure 1:
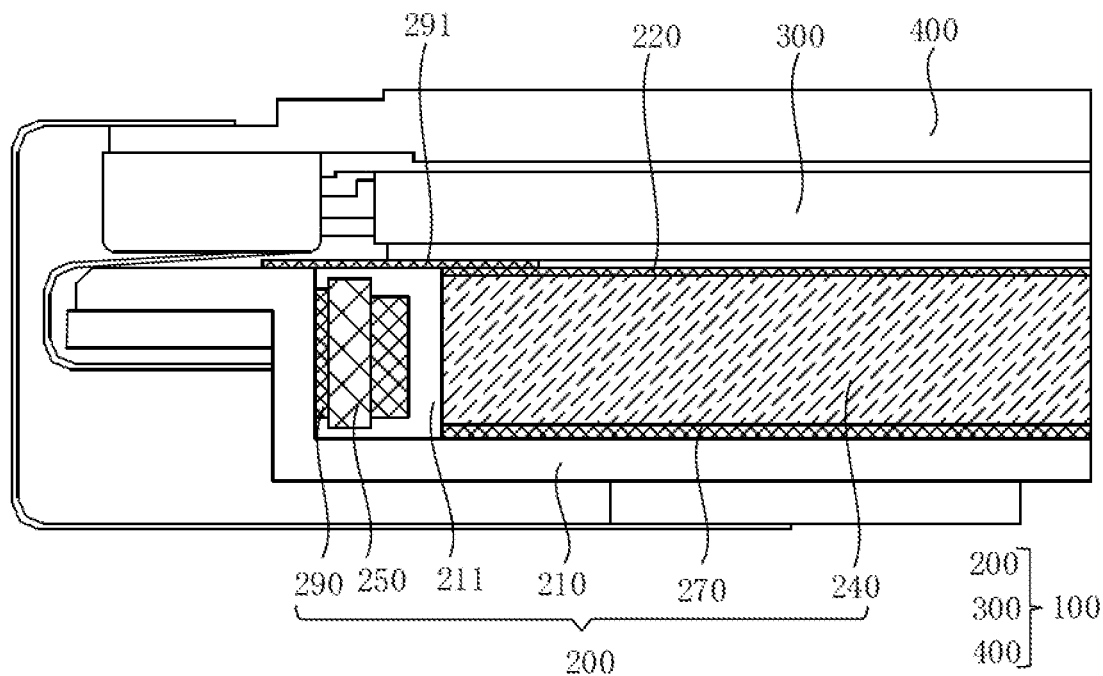
FIG. 1 is a first schematic cross-sectional view of a display device provided in a first embodiment of the present application.
Figure 2:
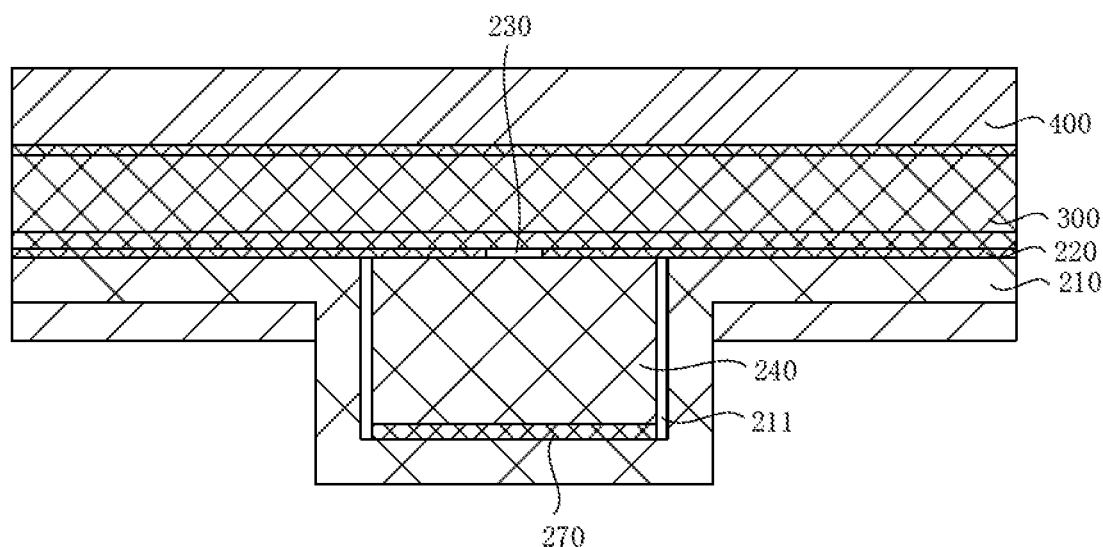
FIG. 2 is a second schematic cross-sectional view of the first display device provided in the first embodiment of the present application.

As shown in FIG. 1 and FIG. 2, FIG. 1 is a first schematic cross-sectional view of a display device provided by a first embodiment of the present application, and FIG. 2 is a second cross-sectional schematic view of a display device provided by the first embodiment of the present application. The first schematic cross-sectional view is a cross-sectional view of the display device taken along the length direction of the assembling seam or gap, and the second schematic cross-sectional view is a cross-sectional view of the display device taken along the width direction of the assembling seam or gap. As a first embodiment of the present application, a display device 100 is disclosed. The display device 100 includes a backlight module 200 and a display panel 400 corresponding to the backlight module 200. The backlight module 200 provides a backlight source for the display panel 400. The backlight module 200 includes a back plate 210 and a plurality of light plate assemblies 220. The plurality of light plate assemblies 220 are arranged on the back plate 210, and there is a seam 230 between the adjacent light plate assemblies 220. The backlight module 200 further includes at least one light guide plate 240 and at least one side light source 250. The light guide plate 240 is arranged at the seam 230. The side light source 250 corresponds to the light guide plate 240 and is disposed on the side of the light guide plate 240 to provide a light source for the light guide plate 240.

The side surface of the light guide plate 240 encompasses both the two ends of the light guide plate 240 and the two sides of the light guide plate 240. The number of the side light sources 250 may be the same as the number of the light guide plates 240, and the side light sources 250 correspond to the light guide plates 240 in one-to-one correspondence. In this case, the side light source 250 may only be disposed at the end of the light guide plate 240, or may only be located on one of both sides of the light guide plate 240. The number of side light sources 250 may also be more than the number of light guide plates 240. In this case, one light guide plate 240 is correspondingly provided with a plurality of side light sources 250, and the plurality of side light sources 250 may be located at either or both ends of the light guide plate 240, or may be located at either or both sides of the light guide plate 240, or both at the ends of the light guide plate 240 and at the sides of the light guide plate 240. Of course, the backlight module 200 further includes structures such as the optical film 300, which are not to be enumerated and described here.

Compared with the solution that solves the problem of dark lines in the seam 230 during display by arranging the reflective sheet 270 at the seam 230 of the light plate assemblies 220, the present application provides the light guide plate 240 and the side light source 250 at the seam 230 of the light plate assemblies 220. The light emitted by the side light source 250 is incident from the side of the light guide plate 240, and by virtue of the light guide function of the light guide plate 240, it is emitted from the top of the light guide plate 240, so that the seam 230 emits light, thereby solving the problem of dark lines in the seam 230. Furthermore, in a reflective sheet 270 solution, the reflective sheet 270 only reflects the light emitted by the light emitting units 222 on the light plate 221, and the light emitting units 222 are all on the sides of the reflective sheet 270, so the light emitted by the light emitting units 222 is obliquely transmitted towards the reflective sheet 270, the light reflected back through the reflective sheet 270 is also oblique, causing the light emitted from the seam 230 to be very cluttered. In the present application, however, the light emitted by the light guide plate 240 can be emitted vertically from the seam 230, so that the light emitted from the seam 230 is uniformly arranged, thereby improving the light output effect of the backlight module 200.

In this embodiment, the back plate 210 is provided with at least one groove 211, and the groove 211 is formed by stamping the back plate 210. When assembling the backlight module 200, put the light guide plate 240 and the side light source 250 into the groove 211, stick the light guide plate 240 on the bottom of the groove 211, and stick the side light source 250 on the side wall of the groove 211, making the light-emitting side of the side light source 250 face the side surface of the light guide plate 240. The side light source 250 may use a general LED light, and of course other types of light-emitting structures may also be used. As for the wiring method and control method of the side light source 250, the same method as the light emitting unit 222 in the light plate assembly 220 can be used. They are both connected to the same power supply and control chip, and share the same driving as the light-emitting unit 222 in the light plate assembly 220, so that local dimming can still be performed everywhere according to the display requirements after the backlight module 200 is matched with the light guide plate 240 and the side light source 250, resulting in superior display effect.

Further, the side light source 250 is fixed to the back plate 210 by the thermally conductive adhesive 290, that is, to the side wall of the groove 211. In this way, when the side light source 250 works for a long time and generates heat, the heat can be transferred to the back plate 210 through the thermal conductive adhesive 290. Since the back plate 210 is generally made of a metal material, the heat dissipation effect is good, and the heat transferred to the back plate 210 can be dissipated in time to prevent the side light source 250 from accumulating too much heat, which would otherwise affect the wirings and film layers near the side light source 250. Furthermore, the top of the side light source 250 is further provided with a small white mirror 291 as a reflective structure. On the one hand, the light emitted by the side light source 250 can be reflected to the light guide plate 240 to improve the light utilization rate. On the other hand, since the side light source 250 is built in the groove 211, and the top of the side light source 250 is covered with a small white mirror 291, the light emitted by the side light source 250 can only be emitted through the light guide plate 240, so that it will not be irradiated from other places, will not cause light leakage, and will not affect the light emitting effect in the light plate assembly 220.

In the groove 211, a reflective sheet 270 can be further arranged, and the reflective sheet 270 is fixedly disposed at the bottom of the groove 211. Specifically, a 0.05 mm substrate-free double-sided adhesive can be used to stick it to the back plate 210, at the bottom the light guide plate 240. Of course, the area of the reflective sheet 270 can also be increased, so that the reflective sheet 270 is not only positioned at the bottom of the light guide plate 240, but also positioned at the bottom of the side light source 250, so that the reflection effect is better. In this case, the orthographic projection of the light guide plate 240 and the orthographic projection of the side light source 250 each overlap the orthographic projection of the reflective sheet 270 along a direction perpendicular to the back plate 210. During assembly, the reflective sheet 270 can be bonded to the bottom of the groove 211 first, the side light source 250 can then be bonded to the side wall of the groove 211, and then the light guide plate 240 can be bonded to the reflective sheet 270. The installation sequence can also be adjusted depending on specific conditions, which is not limited here.

Since the seam 230 between the light plate assemblies 220 is relatively small, if the groove 211 is not provided in the back plate 210 and the light guide plate 240 is placed between two adjacent light plate assemblies 220, either the size of the seam 230 between the light plate assemblies 220 needs to be enlarged, or the light guide plate 240 needs to be divided into smaller sizes through a complex process, which will make the production process of the backlight module 200 more complicated. Furthermore, the performance of the light guide plate 240 will be deteriorated, because the size of the light guide plate 240 cannot be too small, the light guide plate 240 needs a certain width to ensure the amount of incident light, and the light guide plate 240 also needs to have a certain height to ensure that the angle of the incident light is guided into vertical emitted light. If the width of the light guide plate 240 is not enough, the amount of incoming light will be too small, which will cause the brightness of the light emitted by the light guide plate 240 to become dim. If the thickness of the light guide plate 240 is insufficient, the light guide effect of the light guide plate 240 will not be sufficient, and the uniformity of the light output of the light guide plate 240 will be deteriorated. Therefore, in this embodiment, a groove 211 is added in the back plate 210, and the light guide plate 240 is built into the groove 211 without occupying the area of the seam 230, so that the width of the light guide plate 240 can be larger than the width of the seam 230, the thickness of the light guide plate 240 can be greater than the thickness of the light plate assembly 220. In this way, it is not necessary to change the original width of the seam 230, so that the light-emitting brightness and light-emitting uniformity of the light guide plate 240 can meet the usage requirements.

Figure 3:
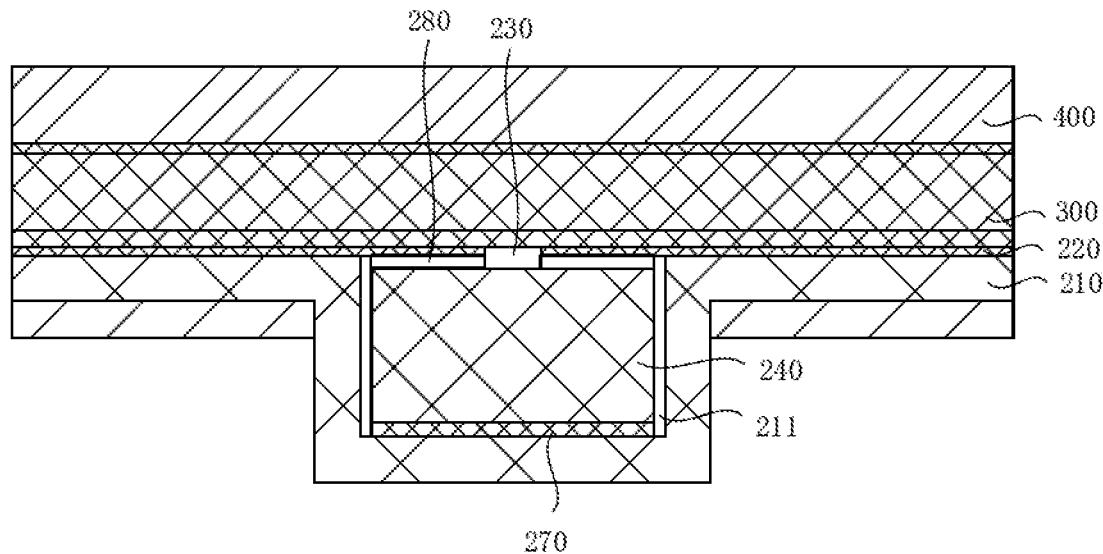
FIG. 3 is a second schematic cross-sectional view of a second display device provided in the first embodiment of the present application.

Furthermore, as shown in FIG. 3, the backlight module 200 further includes a reflective layer 280, and the reflective layer 280 is disposed on the side of the light guide plate 240 opposite to the light plate assembly 220. After the light guide plate 240 is placed in the groove 211, since the width of the light guide plate 240 is greater than the width of the seam 230, only a part of the light guide plate 240 on the side away from the back plate 210 overlaps the seam 230, and the light emitted from the light guide plate 240 can only be emitted through this small area overlapping the seam 230. In other areas of the light guide plate 240 on the side away from the back plate 210, that is, the portions of the light guide plate 240 opposite to the light plate assembly 220, the emitted light of the light guide plate 240 will be blocked by the light plate 221 in the light plate assembly 220, so that the light cannot be emitted from these portions, resulting in waste of the light. In view of this, in this embodiment, a reflective layer 280 is provided on the light guide plate 240 on the side opposite to the light plate assembly 220 to reflect the light blocked by the light plate assembly 220 back to the light guide plate 240, and then through the reflection effect of the reflective sheet 270 at the bottom of the light guide plate 240, part of the light is reflected to the seam 230 to improve light utilization. Furthermore, the side of the light guide plate 240 opposite to the light plate assembly 220 can be further set as an inclined surface, and the corresponding reflective layer 280 is also inclined in this case. By controlling the angle of the inclined slope of the reflective layer 280, the light reflected by the reflective layer 280 can be irradiated obliquely on the reflective sheet 270, so that more light will be collected at the corresponding seam 230 in the light guide plate 240, thereby further improving the utilization rate of light.

In addition, in this embodiment, the light guide plate 240 and the light plate assembly 220 are not connected, but only abut against each other, and the light guide plate 240 supports the edges of the light plate assembly 220. When the light plate assembly 220 is thermally expanded, the light plates 221 in the light plate assembly 220 can extend toward the seam 230 without being restricted by the light guide plate 240, so that the problem of wrinkling and cracking of the light plates 221 in the light plate assembly 220 will not occur.

Embodiment 2

Figure 4:
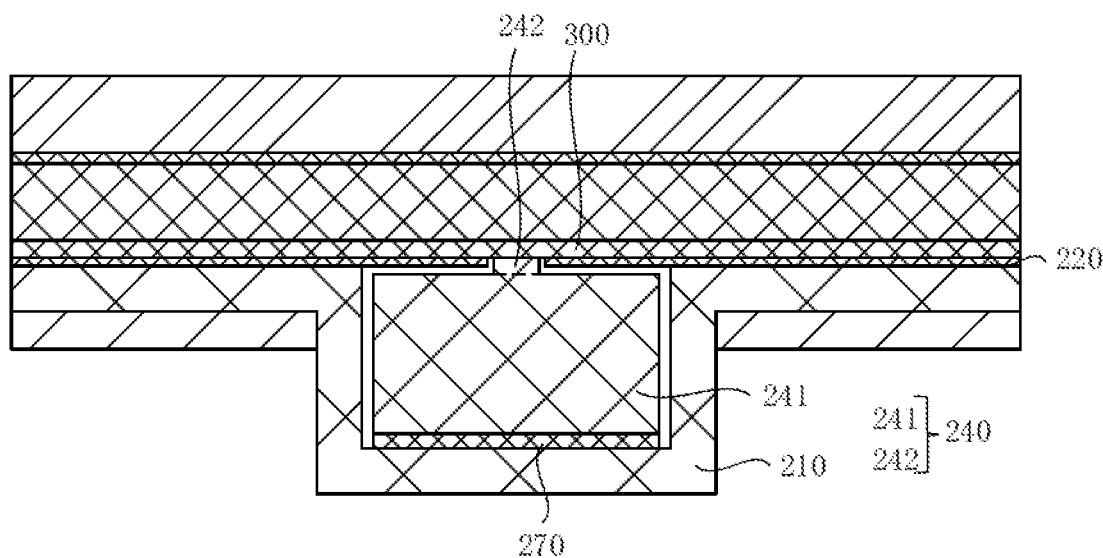
FIG. 4 is a schematic cross-sectional view of a display device according to a second embodiment of the present application.
Figure 5:
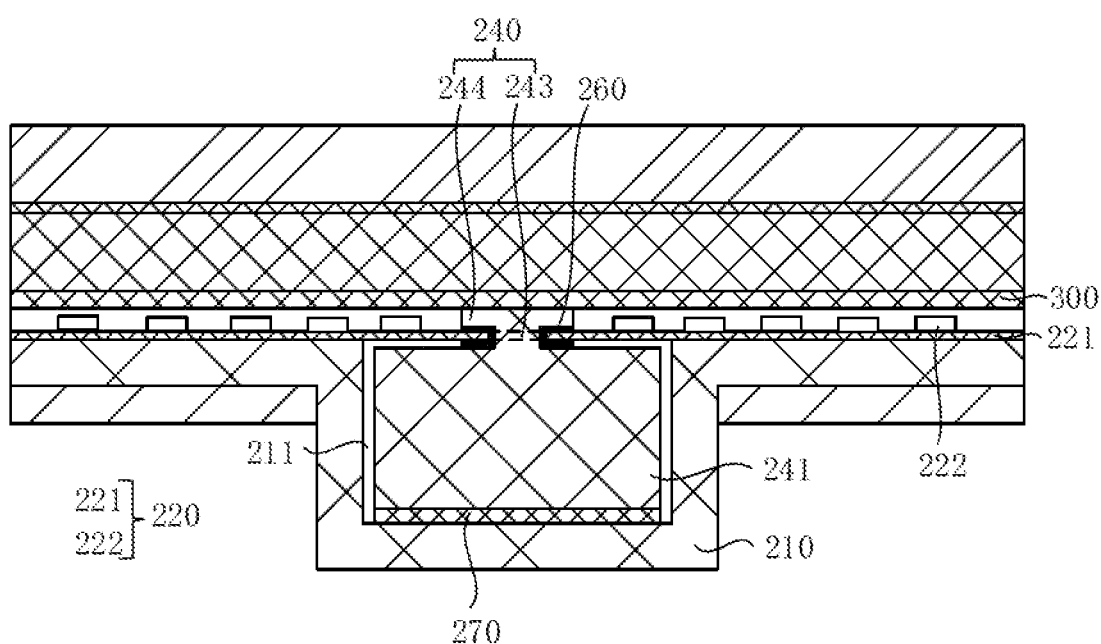
FIG. 5 is a schematic cross-sectional view of a display device provided by a third embodiment of the present application.

FIG. 4 is a schematic cross-sectional view of a display device provided by a second embodiment of the present application, that is, a schematic cross-sectional view of the display device 100 taken alone the width direction of the seam 230. Different from the first embodiment, the light guide plate 240 in this embodiment not only includes the part located in the groove 211 as in the first embodiment, but also includes the part located at the seam 230. Specifically, the light guide plate 240 includes a main body portion 241 and a limiting portion 242. The main body portion 241 is arranged in the groove 211 and is located at the bottom of the light plate assembly 220. The limiting portion 242 is disposed on a side of the main body portion 241 away from the back plate 210, between adjacent light plate assemblies 220, and serves to limit the light plate assemblies 220.

In this case, compared with the first embodiment, the height of the region of the light guide plate 240 that overlaps the seam 230 is larger, because the top of the region of the original light guide plate 240 that overlaps the seam 230 is flush with the top of the groove 211, the height of the region of the light guide plate 240 that overlaps the seam 230 does not exceed the depth of the groove 211, but now, the region of the light guide plate 240 that overlaps the seam 230 at least extends to between two adjacent light plate assemblies 220 and protrudes from the top of the groove 211, so the height of the region of the light guide plate 240 that overlaps the seam 230 is larger, and the light guide effect for light will be better.

Furthermore, in this embodiment, along the width direction of the seam 230, the cross-section of the limiting portion 242 is identical with the shape of the seam 230, both of which are quadrate (substantially square or rectangular) and elongated, and the limiting portion 242 is integrally formed with the main body 241. When assembling the backlight module 200, the light guide plates 240 and the side light sources 250 are first fixed on the back plate 210. In this case, the limiting portions 242 of the four light guide plates 240 enclose a broken or continuous square shaped limit structure. When assembling the light plate assemblies 220, each light plate assembly 220 can be put into the square shaped limiting structure, and the problem of disorderly arrangement of the light plate assemblies 220 will not occur, which greatly speeds up the assembly efficiency of employees.

When the limiting portions 242 in the four light guide plates 240 form a continuous square shaped limiting structure, the length of the light guide plates 240 is equal to the length of the limiting portions 242. At this time, the edges of the light plate assemblies 220 at all places are abutted with the limiting portions 242, and the limiting effect on the light plate assemblies 220 is better. Furthermore, the heights of the all the light guide plates 240 corresponding to seams 230 are equal, so that the light output effects of all the light guide plates 240 on the back plate 210 are uniform.

In this embodiment, along the width direction of the seam 230, the cross section of the light guide plate 240 is similar to the shape of an inverse letter "T", and the limiting portion 242 is the upper protruding portion of the inverse letter "T". The top of the limiting portion 242 may be flush with the top of the light plate assemblies 220, so that the light emitted from the light guide plate 240 achieves the same light emitting effect as that of the light plate assemblies 220. Furthermore, at this time, the optical film 300 can be directly attached to the light plate assemblies 220 and the limiting portion 242. The bottom of the optical film 300 receives the same supporting effect everywhere, which can ensure the flatness of the optical film 300. Of course, the top of the limiting portion 242 may also be lower than the top of the light plate assemblies 220, or higher than the top of the light plate assemblies 220, which will not affect the limiting effect of the light guide plate 240 on the light plate assemblies 220.

Embodiment 3

FIG. 4 is a schematic cross-sectional view of a display device provided by a third embodiment of the present application, that is, a schematic cross-sectional view of the display device 100 taken alone with width direction of the seam 230. Different from the second embodiment, in this embodiment, in addition to the portion of the limiting portion 242 located between adjacent light plate assemblies 220, a portion of the limiting portion 242 is located above the light plate assemblies 220. Specifically, the limiting portion 242 includes a first connecting portion 243 and a second connecting portion 244. One end of the first connecting portion 243 is connected to the main body portion 241, and the other end is connected to the second connecting portion 244. The width of the first connecting portion 243 is smaller than the width of the second connecting portion 244 and the width of the main body portion 241. The light plate assembly 220 includes a light plate 221 and a plurality of light emitting units 222. The plurality of light-emitting units 222 are disposed on the side of the light plate 221 away from the back plate 210. The height of the first connecting portion 243 is greater than the thickness of the light plate 221. The end portion of the light plate 221 is disposed between the main body portion 241 and the second connecting portion 244, and is located in the clamping groove formed by the limiting portion 242 and the main body portion 241.

Compared with the second embodiment, the limiting effect of the limiting portion 242 in the present embodiment is better for the light plate assemblies 220, because the limiting portion 242 and the main body portion 241 form a clamping groove, so that the limiting portion 242 not only limits the light plate assemblies 220 from the side of the light plate assemblies 220, but also limits the light plate assemblies 220 from above the light plate assemblies 220. When assembling the light plate assemblies 220, the edge of the light plate 221 in the light plate assemblies 220 is inserted into the clamping groove in the limiting portion 242, and no additional process or structure is even required to fix the light plate assemblies 220 and the back plate 210 together, the assembly process of the entire backlight module 200 is simpler and more efficient.

Not only that, in this embodiment, the optical film 300 is separated from the light plate assemblies 220 by the second connecting portion 244, so that a gap is formed between the optical film 300 and the light plate assemblies 220, the light emitting distance of the light emitting units 222 in the light plate assemblies 220 is increased, and the uniform light output effect of the light plate assemblies 220 is improved. When the size of the display panel 400 in the display device 100 is large, the light-emitting requirements of the light plate assemblies 220 are high. In this case, applying the technical solution in this embodiment to the larger size panel will have a better effect.

In the width direction along the seam 230, the cross-sections of the first connecting portion 243 and the second connecting portion 244 are both quadrate, and the cross-section of the limiting portion 242 is T-shaped at this time. The cross-section of the second connecting portion 244 may also be semicircular, and at this time, the cross-section of the limiting portion 242 is umbrella-shaped or mushroom-shaped. Of course, the cross-section of the second connecting portion 244 may also have other shapes.

After the light guide plate 240 is installed on the back plate 210, an optical glue 260 can be filled in the clamping groove formed between the limiting portion 242 and the main body portion 241 to fix the light guide plate 240 and the light plate assemblies 220, improving the stability of the light plate assemblies 220. Furthermore, after the optical glue 260 is cured, not only will the light guide plate 240 be separated from the light plate 221, but the optical glue 260 itself will also have a certain elasticity. Even if the light plates 221 are heated and expanded, it will only squeeze the optical glue 260 to deform the optical glue 260, but will not make the light guide plate 240 and the light plate 221 directly contact. Therefore, the deformation of the light plates 221 will not occur, and the problem of wrinkling and cracking of the light plates 221 will not occur. Further, in the clamping groove formed between the limiting portion 242 and the main body portion 241, the optical glue 260 is coated on the three inner side walls of the clamping groove, that is, simultaneously coated on the second connecting portion 244 constituting a first side of the clamping groove, the first connecting portion 243 constituting a second side of the clamping groove, and the main body portion 241 constituting a third side of the clamping groove. At this time, the light plate 221 will not be squeezed by the light guide plate 240 whether it expands horizontally or vertically, which better solves the problem of thermal expansion and contraction of the light plate 221.

It should be noted that the inventive concept of the present application can form a large number of embodiments, but they cannot be enumerated because the length of the application document is limited The technical features as set forth herein can be arbitrarily combined to form a new embodiment, and the original technical effects may be enhanced after various embodiments or technical features are combined.

The foregoing is a further detailed description of the present application in conjunction with specific optional embodiments, but it should not be construed as that the specific implementation of the present application will be limited to these descriptions. For those having ordinary skill in the technical field of the present application, without departing from the scope and spirit of the present application, some simple deductions or substitutions can be made, which should all be regarded as falling in the scope of protection of the present application.

What is claimed is:

1. A backlight module, comprising a back plate and a plurality of light plate assemblies arranged on the back plate, wherein there is a seam between every two adjacent light plate assemblies, the backlight module further comprising:
    at least one light guide plate, disposed at the seam; and
    at least one side light source, disposed corresponding to the light guide plate and on a side of the light guide plate, and configured to provide a light source for the light guide plate;
    wherein at least one groove is defined in a side of the back plate facing towards the plurality of light plate assemblies, and wherein the light guide plate and the side light source are disposed in the groove and are fixedly connected to the back plate;
    wherein a width of the light guide plate is greater than a width of the seam, and a thickness of the light guide plate is greater than a thickness of each of the light plate assemblies.

2. The backlight module as recited in claim 1, wherein the light guide plate abuts against the respective light plate assemblies.

3. The backlight module as recited in claim 1, wherein the light guide plate comprises a main body portion and a limiting portion, wherein the main body portion is arranged in the groove, and is located on a bottom the respective light plate assemblies;
    wherein the limiting portion is disposed on a side of the main body portion away from the back plate and located between the respective adjacent light plate assemblies, and is configured to limit the respective light plate assemblies.

4. The backlight module as recited in claim 2, further comprising a reflective sheet and a reflective layer, wherein the reflective sheet is disposed on a side of the main body portion away from the respective light plate assemblies, and wherein the reflecting layer is disposed on a side of the main body portion opposite to the respective light plate assemblies.

5. The backlight module as recited in claim 2, wherein along a width direction of the seam, a cross-section of the limiting portion is quadrate, and wherein the limiting portion abuts against the respective light plate assemblies, and wherein a top of the limiting portion is flush with tops of the light plate assemblies.

6. The backlight module as recited in claim 2, wherein the limiting portion comprises a first connecting portion and a second connecting portion, wherein one end of the first connecting portion is connected to the main body portion, and the other end of the first connecting portion is connected to the second connecting portion, and wherein a width of the first connecting portion is smaller than a width of the second connecting portion and a width of the main body portion; wherein each light plate assembly comprises a light plate and a plurality of light-emitting units arranged on a side of the light plate away from the back plate; wherein a height of the first connecting portion is greater than a thickness of the light plate, and wherein an end portion of the light plate is arranged between the main body portion and the second connecting portion.

7. The backlight module as recited in claim 6, wherein along a width direction of the seam, cross-sections of the first connecting portion and the second connecting portion are both quadrate, and wherein a cross section of the limiting portion is T-shaped.

8. The backlight module as recited in claim 6, wherein along a width direction of the seam, a cross-section of the first connecting portion is quadrate, and wherein a cross-section of the second connecting portion is semicircular.

9. The backlight module as recited in claim 6, wherein a top of the limiting portion is higher than tops of the respective light plate assemblies.

10. The backlight module as recited in claim 6, wherein a clamping groove is defined between the limiting portion and the main body portion; wherein the second connecting portion constitutes a first side of the clamping groove, the first connecting portion constitutes a second side of the clamping groove, and the main body portion constitutes a third side of the clamping groove; and an optical glue is coated on the first side, the second side, and the third side of the clamping groove.

11. The backlight module as recited in claim 1, wherein the at least one light guide plate is attached to a bottom of the at least one groove, and the at least one side light source is attached to a sidewall of the at least one groove.

12. The backlight module as recited in claim 11, wherein the side light source is attached to the sidewall of the at least one groove by a thermally conductive adhesive.

13. The backlight module as recited in claim 11, wherein a white mirror is disposed on a top of the side light source and is operative to reflect light emitted by the side light source.

14. The backlight module as recited in claim 11, further comprising a reflective sheet fixedly disposed at a bottom of the groove, wherein an orthographic projection of the light guide plate and an orthographic projection of the side light source each overlap an orthographic projection of the reflective sheet.

15. A backlight module, comprising a back plate and a plurality of light plate assemblies arranged on the back plate, wherein there is a seam between every two adjacent light plate assemblies, and wherein at least one groove is defined in a side of the back plate facing towards the plurality of light plate assemblies, the backlight module further comprising:
- at least one reflective sheet, disposed corresponding to the at least one groove and fixedly disposed at a bottom of the groove;
- at least one light guide plate, disposed at the seam and comprising a main body portion and a limiting portion, wherein the main body portion is disposed in the groove and fixed to the reflective sheet and is disposed on a bottom of the respective light plate assemblies; wherein the limiting portion is disposed on a side of the main body portion facing away from the back plate and is located between two adjacent light plate assemblies to limit the light plate assemblies; wherein the light guide plate is T-shaped;
- at least one side light source, disposed on a side of the light guide plate and configured to provide a light source for the light guide plate, wherein the side light source is bonded to a side wall of the groove by a thermally conductive adhesive; and
- at least one reflective layer, disposed on a side of the main body portion opposite to the groove.

16. A display device, comprising a backlight module and a display panel disposed corresponding to the backlight module, wherein the backlight module is configured to provide a backlight source for the display panel;
- wherein the backlight module comprises a back plate and a plurality of light plate assemblies arranged on the back plate, wherein there is a seam between every two adjacent light plate assemblies, the backlight module further comprising:
  - at least one light guide plate, disposed at the seam; and
  - at least one side light source, disposed corresponding to the light guide plate and on a side of the light guide plate, and configured to provide a light source for the light guide plate;
- wherein at least one groove is defined in a side of the back plate facing towards the plurality of light plate assemblies, and wherein the light guide plate and the side light source are disposed in the groove and are fixedly connected to the back plate;
- wherein a width of the light guide plate is greater than a width of the seam, and a thickness of the light guide plate is greater than a thickness of each of the light plate assemblies.

* * * * *